(12) United States Patent
Ahmed et al.

(10) Patent No.: US 7,945,562 B2
(45) Date of Patent: May 17, 2011

(54) JOIN PREDICATE PUSH-DOWN OPTIMIZATIONS

(75) Inventors: Rafi Ahmed, Fremont, CA (US); Allison Lee, Sunnyvale, CA (US); Dinesh Das, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 303 days.

(21) Appl. No.: 11/716,190

(22) Filed: Mar. 8, 2007

(65) Prior Publication Data

US 2007/0219951 A1   Sep. 20, 2007

Related U.S. Application Data

(60) Provisional application No. 60/782,785, filed on Mar. 15, 2006.

(51) Int. Cl.
*G06F 7/00* (2006.01)
*G06F 17/30* (2006.01)

(52) U.S. Cl. ........................................ 707/718; 707/719

(58) Field of Classification Search ........................ None
See application file for complete search history.

(56) References Cited

U.S. PATENT DOCUMENTS

| | | |
|---|---|---|
| 4,769,772 A | 9/1988 | Dwyer |
| 4,829,427 A | 5/1989 | Green |
| 5,091,852 A | 2/1992 | Tsuchida et al. |
| 5,325,525 A | 6/1994 | Shan et al. |
| 5,339,429 A | 8/1994 | Tanaka et al. |
| 5,412,804 A | 5/1995 | Krishna |
| 5,437,032 A | 7/1995 | Wolf et al. |
| 5,452,468 A | 9/1995 | Peterson |
| 5,495,419 A | 2/1996 | Rostoker et al. |
| 5,495,605 A | 2/1996 | Cadot |
| 5,495,606 A | 2/1996 | Borden et al. |
| 5,537,588 A | 7/1996 | Engelmann et al. |
| 5,548,755 A | 8/1996 | Leung et al. |
| 5,551,027 A | 8/1996 | Choy et al. |
| 5,574,900 A | 11/1996 | Huang et al. |
| 5,590,319 A | 12/1996 | Cohen et al. |
| 5,590,324 A | 12/1996 | Leung et al. |
| 5,642,515 A | 6/1997 | Jones et al. |
| 5,675,791 A | 10/1997 | Bhide et al. |
| 5,680,547 A | 10/1997 | Chang |
| 5,710,915 A | 1/1998 | McElhiney |
| 5,787,251 A | 7/1998 | Hamilton et al. |
| 5,797,136 A | 8/1998 | Boyer et al. |
| 5,822,748 A | 10/1998 | Cohen et al. |

(Continued)

OTHER PUBLICATIONS

Deutsch, Alin et al., "Minimization and Group-By Detection for Nested XQueries", University of California, San Diego, 2003, 15 pages.

(Continued)

*Primary Examiner* — Sathyanarayan Pannala
(74) *Attorney, Agent, or Firm* — Hickman Palermo Truong & Becker LLP

(57) ABSTRACT

Join predicate push down transformations push down a join predicate of an outer query into a view. Among the types of views for which join predicate push down is performed are a view with a GROUP BY or DISTINCT operator, an anti-joined or semi-joined view, and a view that contains one or more nested views. During optimization, join predicate push down may be used to generate many transformed queries for comparison. The number of query transformations performed for comparison is managed.

12 Claims, 2 Drawing Sheets

U.S. PATENT DOCUMENTS

| | | | |
|---|---|---|---|
| 5,832,477 A | | 11/1998 | Bhargava et al. |
| 5,848,408 A | * | 12/1998 | Jakobsson et al. ............... 707/3 |
| 5,857,180 A | | 1/1999 | Hallmark et al. |
| 5,905,981 A | | 5/1999 | Lawler |
| 5,918,225 A | | 6/1999 | White et al. |
| 5,924,088 A | | 7/1999 | Jakobsson et al. |
| 5,963,932 A | | 10/1999 | Jakobsson et al. |
| 5,974,408 A | | 10/1999 | Cohen et al. |
| 6,009,265 A | | 12/1999 | Huang et al. |
| 6,026,394 A | | 2/2000 | Tsuchida et al. |
| 6,044,378 A | | 3/2000 | Gladney |
| 6,061,676 A | | 5/2000 | Srivastava et al. |
| 6,067,542 A | | 5/2000 | Carino, Jr. |
| 6,289,334 B1 | | 9/2001 | Reiner et al. |
| 6,298,342 B1 | | 10/2001 | Graefe et al. |
| 6,339,768 B1 | | 1/2002 | Leung et al. |
| 6,370,524 B1 | | 4/2002 | Witkowski |
| 6,430,550 B1 | | 8/2002 | Leo et al. |
| 6,438,558 B1 | | 8/2002 | Stegelmann |
| 6,438,562 B1 | | 8/2002 | Gupta et al. |
| 6,510,422 B1 | | 1/2003 | Galindo-Legaria et al. |
| 6,529,896 B1 | | 3/2003 | Leung et al. |
| 6,529,901 B1 | | 3/2003 | Chaudhuri et al. |
| 6,535,874 B2 | | 3/2003 | Purcell |
| 6,615,203 B1 | * | 9/2003 | Lin et al. ............... 707/3 |
| 6,618,719 B1 | * | 9/2003 | Andrei ............... 707/2 |
| 6,622,138 B1 | | 9/2003 | Bellamkonda et al. |
| 6,665,664 B2 | * | 12/2003 | Paulley et al. ............... 707/4 |
| 6,684,203 B1 | | 1/2004 | Waddington et al. |
| 6,694,306 B1 | | 2/2004 | Nishizawa et al. |
| 6,792,420 B2 | | 9/2004 | Stephen Chen et al. |
| 6,801,905 B2 | | 10/2004 | Andrei |
| 6,901,405 B1 | | 5/2005 | McCrady et al. |
| 6,934,699 B1 | | 8/2005 | Haas et al. |
| 6,941,360 B1 | | 9/2005 | Srivastava et al. |
| 6,954,776 B1 | | 10/2005 | Cruanes et al. |
| 6,961,729 B1 | | 11/2005 | Toohey et al. |
| 6,980,988 B1 | | 12/2005 | Demers et al. |
| 6,990,503 B1 | | 1/2006 | Luo et al. |
| 7,031,956 B1 | | 4/2006 | Lee et al. |
| 7,072,896 B2 | | 7/2006 | Lee et al. |
| 7,089,225 B2 | | 8/2006 | Li et al. |
| 7,146,360 B2 | | 12/2006 | Allen et al. |
| 7,167,852 B1 | | 1/2007 | Ahmed et al. |
| 7,246,108 B2 | | 7/2007 | Ahmed |
| 7,467,128 B2 | * | 12/2008 | Larson et al. ............... 707/2 |
| 2001/0047372 A1 | | 11/2001 | Gorelik et al. |
| 2002/0038313 A1 | | 3/2002 | Klein et al. |
| 2002/0138376 A1 | | 9/2002 | Hinkle |
| 2003/0055814 A1 | | 3/2003 | Chen et al. |
| 2003/0120825 A1 | | 6/2003 | Avvari et al. |
| 2004/0068509 A1 | | 4/2004 | Garden et al. |
| 2004/0068696 A1 | | 4/2004 | Seyrat et al. |
| 2004/0143791 A1 | | 7/2004 | Ito et al. |
| 2004/0148278 A1 | | 7/2004 | Milo et al. |
| 2004/0220911 A1 | | 11/2004 | Zuzarte et al. |
| 2004/0220923 A1 | | 11/2004 | Nica |
| 2004/0267760 A1 | | 12/2004 | Brundage et al. |
| 2004/0268305 A1 | | 12/2004 | Hogg et al. |
| 2005/0033730 A1 | | 2/2005 | Chaudhuri et al. |
| 2005/0055382 A1 | | 3/2005 | Ferrat et al. |
| 2005/0076018 A1 | | 4/2005 | Neidecker-Lutz |
| 2005/0149584 A1 | | 7/2005 | Bourbonnais et al. |
| 2005/0187917 A1 | | 8/2005 | Lawande et al. |
| 2005/0198013 A1 | | 9/2005 | Cunningham et al. |
| 2005/0210010 A1 | | 9/2005 | Larson et al. |
| 2005/0234965 A1 | | 10/2005 | Rozenshtein et al. |
| 2005/0278289 A1 | | 12/2005 | Gauweiler et al. |
| 2005/0278616 A1 | | 12/2005 | Eller |
| 2005/0283471 A1 | | 12/2005 | Ahmed |
| 2005/0289125 A1 | | 12/2005 | Liu et al. |
| 2006/0026115 A1 | | 2/2006 | Ahmed |
| 2006/0026133 A1 | | 2/2006 | Ahmed |
| 2006/0041537 A1 | | 2/2006 | Ahmed |
| 2006/0167865 A1 | | 7/2006 | Andrei |
| 2006/0168513 A1 | | 7/2006 | Coulson et al. |
| 2006/0218123 A1 | | 9/2006 | Chowdhuri et al. |
| 2007/0027880 A1 | | 2/2007 | Dettinger et al. |
| 2007/0044012 A1 | | 2/2007 | Suver et al. |
| 2007/0073643 A1 | | 3/2007 | Ghosh et al. |
| 2007/0192283 A1 | * | 8/2007 | Larson et al. ............... 707/2 |
| 2008/0010240 A1 | | 1/2008 | Zait |
| 2008/0077606 A1 | | 3/2008 | Fang et al. |

OTHER PUBLICATIONS

Dehaan, David, "A Rewriting Algorithm for Multi-Block Aggregation Queries and Views using Prerequisites and Compensations", University of Waterloo, Canada, Technical Report CS-2004-25, May 3, 2004, 39 pages.

Chaudhuri, Surajit, "An Overview of Query Optimization in Relational Systems", Microsoft Research, 1998, 10 pages.

Muralikrishna, M., "Improved Unnesting Algorithms for Join Aggregate SQL Queries", VLDB Conference, Canada, 1992, 12 pages.

Hayu, John, "Analytic SQL Features in Oracle9i", An Oracle Technical White Paper, Dec. 2001, 32 pages.

Oracle, "Optimizer Modes, Plans Stability, and Hints", Oracle8i Tuning Release 8.1.5 A67775-01, Oracle Website, 1999, 54 pages.

Bergsten, et al., "Prototyping DBS3 a Shared-Memory Parallel Database System", IEEE 818622954, 226-234, 1991, pp. 226-234.

Bhide, Anupam, "An Analysis of Three Transaction Processing Architectures", Computer Science Division, UC Berkeley, Proceeding of the 14th VLDB Conference, 1998, pp. 339-350.

Copeland, George et al., "Data Placement in Bubba," ACM 0897912683, 1988, pp. 99-108.

Dayal, Umeshwar, "Of Nests and Trees: A Unified Approach to Processing Queries That Contain Nested Subqueries, Aggregates and Quantifiers", Proceedings of the 13th VLDB Conference, Brighton 1987, pp. 197-208.

Dewitt, et al., "A Performance Analysis of the Gamma Database Machine," Computer Sciences Department, University of Wisconsin, 1988, pp. 350-360.

Englert, Susan et al., "A Benchmark of Nonstop SQL Release 2 Demonstrating Near-Linear Speedup and Scaleup on Large Databases", Technical Report 89.4, Tandem Part No. 27469, May 1989, pp. 1-23.

Graefe, Goetz, "Encapsulation of Parallelism in the Volcano Query Processing System," Mar. 1990, pp. 102-111.

Hirano, et al., "Load Balancing Algorithm for Parallel Processing on Shared Memory Multiprocessor", IEEE, pp. 210-217, 1991.

Hong, et al., "Optimization of Parallel Query Execution Plans in XPRS", Proceedings of the First International Conference on Parallel and Distributed Information Systems, IEEE, 1991, pp. 218-225.

Leverenz et al., "Oracle 8i Concepts Release 8.1.5- A67781-01", Oracle Corporation, Feb. 1999, located on the internet at <http://www.csee.umbc.edu/help/oracle8/server.815/a67781/toc.htm>, 122 pages.

Lumpkin, George et al., "Query Optimization in Oracle 9/", Oracle Corporation, Oracle White Paper, Feb. 2002, pp. 1-30.

Pirahesh, Hamid, et al., "Extensible/Rule Base Query Rewrite Optimization in Starburst", IBM Almaden Research Center, 9 pages.

Selinger, P. Griffiths, et al., "Access Path Selection in a Relational Database Management System", Proceedings of the 1979 ACM SIGMOD International Conference on the Management of Data, 1979, pp. 23-34.

Stonebraker, Michael, et al. "The Design of XPRS," Proceedings of the 14th VLDB Conference, 1988, pp. 318-330.

Tandem, "A Benchmark of NonStop SQL on the Debit Credit Transaction", The Tandem Performance Group, 1988, pp. 337-341.

Ahmed, Rafi, et al., "Cost-Based Query Transformation in Oracle," Copyright 2006 VLDB, ACM 1595933859, pp. 1026-1036.

Oracle, "Oracle 9I Database Documentation", Oracle, Parts A96670-01, A96674-01, A96673-02, 2002, 833 pages.

Fitzgerald et al., "Special Edition Using Crystal Reports IO", Que, Chapters 23, 24, 27, 35, Appendix A, Jul. 14, 2004, 170 pages.

Rankins et al., "Microsoft SQL Server 2000 Unleashed," Second Edition, Sams, Chapters 3, 4, 5, 6, 36, Dec. 18, 2002, 109 pages.

Erickson, Gail, "Improving Performance with SQL Server 2000 Indexed Views", Microsoft TechNet, Microsoft Corporation, Sep. 2000, 13 pages.

Rosenthal, Arnon, et al., "Outerjoin Simplification and Reordering for Query Optimization", ACM 1997, 31 pages.

Seshadri, Praveen, et al., "Cost-Based Optimization for Magic: Algebra and Implementation", SIGMOD Jun. 1996, ACM 1996, 11 pages.

Muralikrishna, M., "Improving Unnesting Algorithem for Join Aggregate SQL Queries", 18th VLDB Conference, Canada 1992, 12 pages.

Chaudhuri, Surajit, et al., "Including Group-By in Query Optimization", Hewlett-Packard Laboratories, 20th VLDB Conference Chile, 1994, 9 pages.

Mishra, Priti, et al., "Join Processing in Relational Databases", ACM Computing Surveys, Mar. 1992, 50 pages.

Chen, et al., "View merging in the context of view selection changing", Database Engineering and Applications Symposium 2002, Proceedings, Jul. 2002, 10 pages.

Srivastava, J .et al., "Optimizing Multi-Join Queries in Parallel Relational Databases" Jan. 20-22, 1993, pp. 84-92. Download: http://ieeexplore.ieee.org/stamp/stamp.jsp?arnumber=00253067.

Lin, X. et al., "Using Parallel Semi-Join Reduction to Minimize Distributed Query Response Time" Algorithms and Architectures for Parallel Processing, Apr. 19-21, 1995,. vol. 2, pp. 517-526. Download: http://ieeexplore.ieee.org/stamp/stamp.jsp?arnumber=00472236.

U.S. Appl. No. 11/237,040, filed Sep. 27, 2005, Interview Summary, Feb. 16, 2010.

Kemp et al. "Improving Federated Database Queries Using Declarative Rewrite Rules for Quantified Subqueries," Journal of Intelligent Information Systems, Dec. 2001. vol. 17, Iss. 2-3; p. 281. Download: http://proquest.umi.com/pqdlink?Ver=1&Exp=04-11-2015&FMT=7&DID=352547461&RQT=309&cfc=1.

* cited by examiner

JOIN PREDICATE PUSH-DOWN OPTIMIZATIONS

RELATED APPLICATIONS

The present application is related to U.S. patent application Ser. No. 11/716,126 and now issued as U.S. Pat. No. 7,702,627, entitled *Efficient Interaction among Cost-Based Transformations*, filed by Rafi Ahmed and Allison Lee, on Mar. 8, 2007, the entire content of which is incorporated herein by reference.

FIELD OF THE INVENTION

The present invention relates to database systems, and in particular, to optimization of queries executed by a database system.

BACKGROUND

Relational and object-relational database management systems store information in tables of rows in a database. To retrieve data, queries that request data are submitted to a database server, which computes the queries and returns the data requested.

Query statements submitted to the database server should conform to the syntactical rules of a particular query language. One popular query language, known as the Structured Query Language (SQL), provides users a variety of ways to specify information to be retrieved.

A query submitted to a database server is evaluated by a query optimizer. Based on the evaluation, the query optimizer generates an execution plan that defines operations for executing the query. Typically, the query optimizer generates an execution plan optimized for efficient execution.

When a query optimizer evaluates a query, it determines various "candidate execution plans" and selects an optimal execution plan. The query may be transformed into one or more semantically equivalent queries. For the query and the one or more of transformed queries, various candidate execution plans are generated.

In general, a query optimizer generates optimized execution plans when the query optimizer is able to perform more kinds transformations under more kinds of conditions. Based on the foregoing, there is clearly a need for more ways of transforming queries.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In a join predicate pushdown transformation, a join predicate of an outer query is pushed down into a view. Described herein are novel transformations for performing join predicate push-down, creating more ways of transforming a query. A query optimizer is able to create more kinds of transformations, creating more possible ways of optimizing a query. During optimization, there are so many possible transformations that could be generated and compared that doing so is too costly. See *Cost Based Query Transformation in Oracle*, by Rafi Ahmed, Allison Lee, Andrew Witkowski, Dinesh Das, Hong Su, Mohamed Zait, Thierry Cruanes (32nd International Conference on Very Large Databases, 2006).

Illustrative Operational Environment

Figure 1:
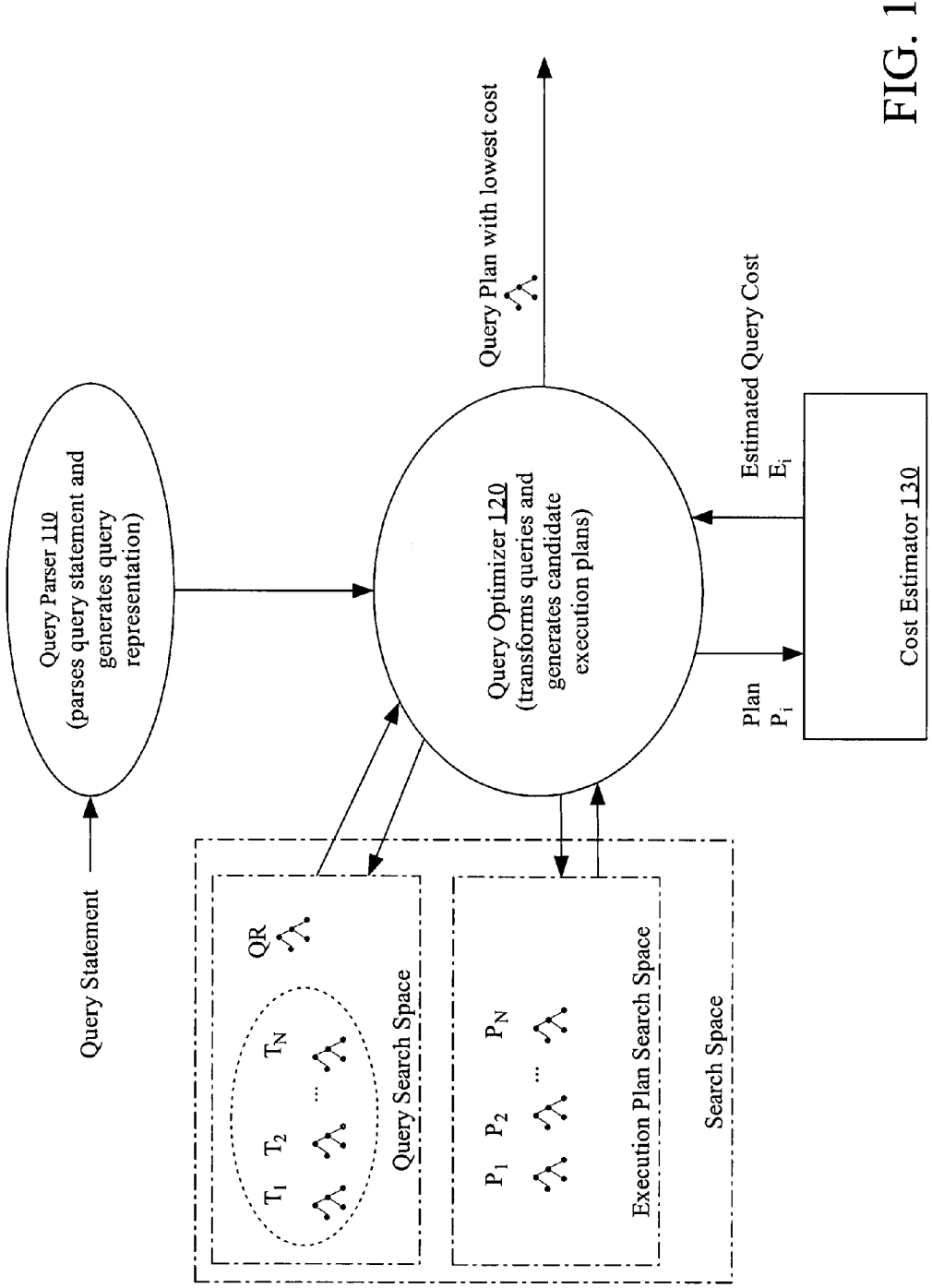
FIG. 1 is a diagram of a query optimizer according to an embodiment of the present invention.

FIG. 1 is a diagram depicting a query optimizer and related components within a database server (not shown). Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs. Database applications interact with a database server by submitting to the database server commands that cause the database server to perform operations on data stored in a database. A database command may be in the form of a database statement. For the database server to process the database statements, the database statements must conform to a database language supported by the database server. One non-limiting database language supported by many database servers is SQL, including proprietary forms of SQL supported by such database servers as Oracle, (e.g. Oracle Database 10 g). SQL data definition language ("DDL") instructions are issued to a database server to create or configure database objects, such as tables, views, or complex types.

Generally, data is stored in a database in one or more data containers, each container contains records, and the data within each record is organized into one or more fields. In relational database systems, the data containers are typically referred to as tables, the records are referred to as rows, and the fields are referred to as columns. In object oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

Query Optimizer and Execution Plans

Referring to FIG. 1, query parser 110 receives a query statement QS and generates an internal query representation QR of the query statement. Typically, the internal query representation is a set of interlinked data structures that represent various components and structures of a query statement. The internal query representation may be in the form of a graph of nodes, each interlinked data structure corresponding to a node and to a component of the represented query statement. The internal representation is typically generated in memory for evaluation, manipulation, and transformation by query optimizer 120.

The term query is used herein to refer to any form of representing a query, including a query in the form of a database statement or in the form of an internal query representation. Query optimizer 120 may receive a query from another entity other than query parser 110, where the query received is in the form of an internal query representation.

Query optimizer 120 generates one or more different candidate execution plans for a query, which are evaluated by query optimizer 120 to determine which should be used to compute the query. For query QS, query optimizer 120 generates candidate execution plans $P_1, P_2$ through $P_N$.

Execution plans may be represented by a graph of interlinked nodes, referred to herein as operators, that each corresponds to a step of an execution plan, referred to herein as an execution plan operation. The hierarchy of the graphs represents the order in which the execution plan operations are performed and how data flows between each of the execution plan operations. Execution plan operations include, for example, a table scan, an index scan, hash-join, sort-merge join, nested-loop join, and filter.

Query optimizer 120 may optimize a query by transforming the query. In general, transforming a query involves rewriting a query into another query that produces the same result and that can potentially be executed more efficiently, i.e. one for which a potentially more efficient and less costly execution plan can be generated. Examples of query transformation include view merging, subquery unnesting, predicate move-around and pushdown, common subexpression elimination, outer-to-inner join conversion, materialized view rewrite, star transformation, and, importantly, join predicate push down. A query is rewritten by manipulating a deep copy of the query representation to form a transformed query representation representing a transformed query. The query as transformed is referred to herein as the transformed query; the query transformed is referred to as the base query.

Query optimizer 120 may perform more than one transformation for evaluation. Each transformed query generated for a query is referred to as candidate transformed query. For query QS, query optimizer 120 generates candidate transformed queries $T_1, T_2 \ldots T_N$. A transformed query rewritten to generate another transformed query is referred to herein as a base query for the other transformed query. The query originally received by the query optimizer 120 is referred to as the original query.

The original query an optimizer optimizes (e.g. query QS) and the alternate transformed queries generated for the query are referred to individually as a candidate query and collectively as the query search space The one or more candidate execution plans generated for each query in the query search space are collectively referred to as the plan search space. The query search space generated by query optimizer 120 for query statement QS includes transformations $T_1, T_2 \ldots T_N$ and query QS; the plan search space comprises $P_1, P_2 \ldots P_N$.

The query search space and the plan search space are collectively referred to herein as the search space. Thus, a search space may contain one or more candidate execution plans for one or more candidate queries, and/or one or more candidate execution plans for candidate queries, including candidate transformed queries.

Cost Estimation

To evaluate the candidate execution plans in the search space, query optimizer 120 estimates a cost of each candidate execution plan and compares the estimated query costs to select an execution plan for execution. In an embodiment, the estimated query cost is generated by a query cost estimator 130, which may be a component of query optimizer 120. For a plan $P_i$ supplied by query optimizer 120, cost estimator 130 computes and generates an estimated query cost $E_i$. In general, the estimated query cost represents an estimate of computer resources expended to execute an execution plan. The estimated cost may be represented as the execution time required to execute an execution plan. To determine which candidate execution plan in the search space to execute, query optimizer 120 may select the candidate execution plan with the lowest estimated cost.

Join Predicate Push-Down

In a join predicate pushdown, a join predicate from an outer query that references a column of a view of an outer query is "pushed down" into a view. To qualify for join predicate pushdown, the join predicate must satisfy one or more criteria. At a minimum, a join predicate belonging to an outer query should reference both a column of the view and a column of a table listed in the FROM clause of the outer query. Various embodiments may require other criteria. Join predicate pushdown is illustrated with the following base query QA.

```
QA =  SELECT T1.C, T2.x
      FROM T1, T2,  (SELECT T4.x, T3.y
                     FROM T4, T3
                     WHERE T3.p = T4.q and T4.k > 4) V
      WHERE T1.c = T2.d and T1.x = V.x (+) and
          T2.d = V.y(+);
```

Query QA includes view V. V is the alias or label for the subquery expression (SELECT T4.x, T3.y FROM T4, T3 WHERE T3.p=T4.q and T4.k>4). The subquery expression is referred to herein as a view because it is a subquery expression among an outer query's FROM list items and can be treated, to a degree, like a view or table. Other tables listed in the FROM list are referred to herein as outer tables with respect to the outer query and/or the view. With respect to the view V, Tables T1 and T2 are outer tables, while tables T3 and T4 are not.

Under join predicate pushdown, query QA is transformed to query QA' as follows.

```
QA'= SELECT T1.C, T2.x
     FROM T1, T2,  (SELECT T4.x, T3.y
                    FROM T4, T3
                    WHERE T3.p = T4.q and T4.k > 4 and
                        T1.x = T4.x and T2.f = T3.y) V
     WHERE T1.c = T2.d;
```

The join predicate T1.x=V.x (+) of the outer query is pushed down into view by rewriting the view V to include the join predicate T1.x=T4.x. T4.x is the equivalent column of the view V.x. Similarly, the join predicate T2.f=V.y (+) is pushed down into the view. The pushed down join predicates do not specify outer-join notation; the outer-join is internally represented by the table being outer-joined.

A pushed-down predicate opens up new access paths, which are exploited to form candidate execution plans that may more efficiently compute a query. For example, a candidate execution plan may compute the join based on join predicate T2.d=T3.y in QA' using an index on either T2.f or T3.y in an index nested-loops join, which is not possible without this transformation.

A query's view may be a UNION of multiple subquery branches. Such a query may be transformed using join predicate push-down by pushing down multiple join predicates, as illustrated with the following base query QB.

```
QB=    SELECT T1.C, T2.x
       FROM T1, T2,
              (SELECT T4.x AS X, T3.y AS Y
              FROM T4, T3
              WHERE T3.p = T4.q and T4.k > 4
              UNION ALL
              SELECT T5.a AS X, T6.b AS Y
              FROM T5, T6
              WHERE T5.m = T6.n) V
       WHERE T1.c = T2.d and T1.x = V.x and T2.f = V.y;
```

The query QB has been transformed into QB' where qualifying join predicates of the outer query have been pushed down inside each branch of the UNION ALL view.

```
QB'=   SELECT T1.C, T2.x
       FROM T1, T2,
              (SELECT T4.x, T3.y
              FROM T4, T3
              WHERE T3.p = T4.q and T4.k > 4 and
                 T1.x = T4.x and T2.f = T3.y
              UNION ALL
              SELECT T5.a, T6.b
              FROM T5, T6
              WHERE T5.m = T6.n and
                 T1.x = T5.a and T2.f = T6.b) V
       WHERE T1.c = T2.d;
```

The outer query join predicates T1.x=V.x and T2.f=V.y have been pushed down into the first branch of the view as T1.x=T4.x and T2.f=T3.y, respectively, and into the second branch as T1.x=T5.a and T2.f=T6.b, respectively. Again join predicate push-down opens up new access paths, and therefore allows the view to be joined with outer tables using index-based nested-loop join.

Join Predicate Push Down for GROUP BY Views

According to an embodiment, novel types of join predicate pushdown transformations may be performed with different types of views. One such view is a GROUP BY view, which is illustrated by the following query QG.

```
QG =   SELECT T1.z, V.x, V.vsum
       FROM T1, T2, (SELECT T4.x, SUM(T3.y) AS vsum
              FROM T4, T3
              WHERE T3.p = T4.q
              GROUP BY T4.x) V
       WHERE T1.c = T2.d and V.vsum > 10 and T1.y = V.x;
```

Under join predicate pushdown for GROUP BY views, join predicates that reference a non-aggregation SELECT list item of a view are pushed down into the view. In query QG, the join predicate query text T1.y=V.x references a non-aggregation SELECT list item V.x of online view V. Thus, this predicate may be pushed down into the view. As a further optimization, if all group-by non-aggregate items participate in join predicates with the view, these join predicates are equi-joins, and these join predicates are pushed down into the view, then the expensive GROUP BY operator may be removed from the view. This removal is valid because correlation on equality conditions acts as a grouping on those column values. Thus, query QG may be transformed into query QG', as follows.

```
QG'=   SELECT T1.z, T1.y, V.vsum
       FROM T1, T2, (SELECT SUM (T3.y) AS vsum
              FROM T4, T3
              WHERE T3.p = T4.q and T1.y = T4.x) V
       WHERE T1.c = T2.d and V.vsum > 10;
```

The join predicate T1.y=V.x is pushed down into the view as T1.y=T4.x, in which V.x is substituted with its equivalent T4.x, respectively. Since a join predicate is on every item of the GROUP BY list (i.e. T4.x) in query QG, the GROUP BY operator has been removed from QG'.

Join Predicate Push Down for DISTINCT Views

Another type of view subject to join predicate push-down is a DISTINCT view, which specifies a DISTINCT operator or a variant in the SELECT clause. The following query QD illustrates a DISTINCT view according to an embodiment of the present invention.

```
QD =   SELECT T1.C, T2.x
       FROM T1, T2, (SELECT DISTINCT T4.x, T3.y
              FROM T4, T3
              WHERE T3.p = T4.q) V
       WHERE T1.c = T2.d and T1.x = V.x and T2.f = V.y;
```

In the join predicate pushdown, one or more join predicates of the outer query are pushed down into a DISTINCT view. If the join predicates with the view are equi-join on all the SELECT items of the view and all these join predicates are pushed down into the view, then an additional optimization can be done by removing the expensive DISTINCT operator and performing nested-loop semi-join rather than nested-loop join for joins involving the SELECT list items. Accordingly, query QD may be transformed into the following transformed query QD'.

```
QD'=   SELECT T1.C, T2.x
       FROM T1, T2, (SELECT T4.x, T3.y
              FROM T4, T3
              WHERE T3.p = T4.q and T1.x = T4.x
                 and T2.f = T3.y) V
       WHERE T1.c = T2.d;
```

QD has been transformed into QD'. The outer query join predicates T1.x=V.x and T2.f=V.y are pushed into view V as T3.p=T4.q and T1.x=T4.x, respectively. The DISTINCT operator has been removed from Q4. The join based on join predicate T1.x=T4.x and the join based on join predicate T2.f=T3.y are performed using a nested-loops semi join rather than nested-loops join. While QG' does not represent these semi-join operations explicitly, a candidate execution plan for QD' implements these equi-joins as a nested-loop semi-join.

Join Predicate Push-Down for Anti-/Semi-Joined Views

Another type of view subject to join predicate push-down is an anti-/semi-joined view, in which the join predicate that is "pushed down" into a view specifies an anti-join and semi-join operation. Such views are generated by, for example, subquery unnesting or MINUS-to-join conversion. Note that, unlike outer-join, a view or a table may be anti-/semi-joined with more than one table. In these cases, there is more than one left table. A left table refers to the table whose rows are returned for an anti-/semi-join operation. This partial order information is maintained when there is more than one left table on the left.

When an anti-/semi-joined view generated by subquery unnesting undergoes join predicate push-down transformation, the evaluation of such views is akin to the filter evaluation of the original subquery form but with one significant difference—the views in which the predicates are pushed into can be evaluated at any point in the join order as long as the partial order is imposed, unlike subquery filter evaluation that generally takes place at the end of all join evaluation.

The following query QA is used to illustrate an anti-joined view that is generated using subquery unnesting and then subsequently transformed using join predicate push-down.

```
QA = SELECT T1.c, T2.x
     FROM T1, T2
     WHERE T1.c = T2.d and NOT EXISTS
         (SELECT 1
          FROM T4, T3
          WHERE T3.p = T4.q and T2.y = T3.y);
```

Subquery unnesting produces the following query QA' with anti-joined view V. Note that the anti-join operator A= is non-standard SQL and is used here for the purpose of illustration only.

```
QA'= SELECT T1.c, T2.x
     FROM T1, T2, (SELECT T3.y
                   FROM T4, T3
                   WHERE T3.p = T4.q) V
     WHERE T1.c = T2.d and T2.y A= v.y;
```

Join predicate pushdown transformation of QA' produces the following query QA", in which the view has undergone join predicate pushdown.

```
QA"= SELECT T1.c, T2.x
     FROM T1, T2, (SELECT T3.y
                   FROM T4, T3
                   WHERE T3.p = T4.q and T2.y = T3.y) V
     WHERE T1.c = T2.d;
```

In QA", the anti-join is internally represented and is not shown. When computed, QA" allows the following join orders: (T1, T2, V), (T2, T1, V), (T2, V, T1). QA, on the other hand, normally allows only the two join orders: (T1, T2, S) and (T2, T1, S), where S represents the subquery.

The following query QS is used to illustrate an semi-joined view that is generated using subquery unnesting and then subsequently transformed using join predicate push-down.

```
QS = SELECT T1.c, T2.x
     FROM T1, T2
     WHERE T1.c = T2.d and EXISTS
         (SELECT 1
          FROM T4, T3
          WHERE T3.p = T4.q and T2.y = T3.y);
```

Subquery unnesting produces the following query QS' with semi-joined view V. Note that the semi-join operator S= is non-standard SQL and is used here for the purpose of illustration only.

```
QS'= SELECT T1.c, T2.x
     FROM T1, T2, (SELECT T3.y
                   FROM T4, T3
                   WHERE T3.p = T4.q) V
     WHERE T1.c = T2.d and T2.y S= V.y;
```

Join predicate push-down transformation of QS' produces the following query QS", in which the view has undergone join predicate push-down.

```
QS"= SELECT T1.c, T2.x
     FROM T1, T2, (SELECT T3.y
                   FROM T4, T3
                   WHERE T3.p = T4.q and T2.y = T3.y) V
     WHERE T1.c = T2.d;
```

In QS", the semi-join is internally represented and is not shown there. When computed, QS" allows the following join orders: (T1, T2, V), (T2, T1, V), (T2, V, T1). QS, on the other hand, normally allows only the two join orders: (T1, T2, S) and (T2, T1, S), where S represents the subquery.

Join Predicate Push-Down for Multi-Level Queries

A view may contain another view, the latter being referred to herein as a nested view. A view that contains a nested view is referred to herein as a multi-level view. A multi-level view is illustrated by the following query QM.

```
QM= SELECT T1.C, T2.x
    FROM T1, T2, (SELECT T4.x, V2.k
                  FROM T4, T3, (SELECT T5.y, T6.k
                                FROM T5, T6
                                WHERE T5.d = T6.d) V2
                  WHERE T4.r = V2.y (+) and T3.p = T4.q) V1
    WHERE T1.c = T2.d and T1.x = V1.k (+);
```

In QM, the nested view is V2. Under join predicate push down, join predicates may be pushed down to the lowest nested view of a multi-level view. In fact, to open an access path, such as an index access path, a join predicate should be pushed down to the lowest level nested view, which in the case of query QM is V2. Under join predicate push down, QM may be transformed to QM' as follows.

```
QM'=  SELECT T1.C, T2.x
      FROM T1, T2, (SELECT T4.x, V2.k
              FROM T4, T3, (SELECT T5.y, T6.k
                      FROM T5, T6
                      WHERE T5.d = T6.d
                      and T1.x = T6.k) V2
              WHERE T4.r = V2.y (+) and T3.p = T4.q)V2
      WHERE T1.c = T2.d;
```

The join predicate T1.x=V1.k (+) has been pushed to the nested view V2 as join predicate T1.x=T6.k.

Join Predicate Push-Down Applicable to Various Kinds of Views

Embodiments of the invention have been illustrated by pushing down join predicates into views that are inline views. A view is a query and/or subquery that may be referenced by a label associated with the view as if the view is a table. The query or subquery of a view is referred to herein as the view's definition. For an inline view in a query, a subquery in the query is the view's definition and the alias assigned by the query to the subquery is the label for the subquery. For example, Query QA includes inline view V. V is the alias and label for the subquery (SELECT T4.x, T3.y FROM T4, T3 WHERE T3.p=T4.q and T4.k>4).

Views may also be defined by a database system, using for example, Data Definition Language commands. Once defined, subsequent queries may refer to the views as if the views are tables defined by the database system; the queries do contain the views' definition, rather, the database system metadata holds the view's definition. When a query referencing a view is received by a database system, the view in the query is in effect replaced with the view's definition. The techniques described in here may then be applied to the view's definition.

Search Space Strategies

In general, when determining how to optimize a query, query optimizer 120 determines a set of query transformations to generate for the query search space. The estimated query cost of each query in the query search space is then computed and compared. A query may contain multiple views into which a join predicate may be pushed. As a result, there may be many join predicate push-down transformations that can be performed. Determining and generating a transformation and estimating its query execution cost consumes computer resources; doing these for all or even a proportion of all possible join predicate push-down transformations for an original query may create a cost that is significant compared to the cost of executing the original query, if not more. Thus, to optimize the cost of query optimization, "transformation search space strategies" are used to select candidate join predicate push-down transformations in order to limit the size of the query search space and the cost of query optimization.

Such transformation search space strategies may be based, at least in part, on heuristics. Heuristics are rules that specify conditions under which a certain type of transformation is or is not performed, and are based on assumptions that are generally true but may not be true for a particular base query. An example of a heuristic is to push down a join predicate only if it opens an index access path. That is, when pushed down into a view, the join predicate references an indexed column. The underlying assumption for this heuristic is that transformation under these circumstances causes an index-based nested-loops join for the pushed down predicate. In the case of a query with multiple possible join predicates that may be pushed down, a transformation that pushes down one of the possible join predicates is only generated for the query search space if the join predicate opens up an index access path.

Search space strategies also include query search space generation procedures that systematically generate combinations join predicate push-down transformations. With the exception of one, the query search space generation procedures generate some but not all possible join predicate push-down transformations. Such procedures are illustrated using the following query QS:

```
QS =  SELECT T1.C,
      FROM T1, (SELECT T2.x as x
              FROM T2, T3
              WHERE T2.z = T3.z) V1,
              (SELECT T4.y as y
              FROM T4, T5
              WHERE T4.z = T5.z) V2
      WHERE T1.x = V1.x (+) and
            T1.y = V2.y(+)
```

One approach, the "exhaustive approach", considers the cost of every possibility for join predicate pushdown transformation. Thus, every join predicate push-down transformation is included in the query search space. In the case of QS, there are four possibilities for join predicate push-down transformations, as follows:

QS00—no predicate is pushed down.
QS10—T1.x=V.x(+) is pushed down into V1.
QS01—T1.y=V.y(+) is pushed down into V2.
QS11—Both predicates are pushed down as above.

Under the exhaustive approach, a query execution cost for each transformation is generated. The transformation with the least cost is selected.

Another approach, the two-pass approach, generates a candidate query that pushes down each qualifying join predicate and compares the query cost to a base query in which none have been pushed down. Under the two-pass approach, of the four possibilities only candidate queries $QS_{00}$ and $QS_{11}$—none and all—are in the query search space. Query costs for both are estimated and compared.

Under the linear approach, each join predicate that can be pushed down is considered in turn. Specifically, for each join predicate, a join predicate push-down transformation involving the join predicate is performed and a query cost is generated for the resulting transformed query. This query cost is compared to the query cost generated for the previously evaluated join predicate. In the case of the first join predicate considered, its query cost is compared to the cost of the query without any join predicate push down. If the query cost is lowered, then a decision is made to push down that join predicate. The join predicate is pushed down in any subsequent join predicate push-down evaluated under the linear approach.

For example, under the linear approach, the query cost of the $QS_{10}$ is computed and compared to that of $QS_{00}$. Since the cost of $QS_{10}$ is less than that of $QS_{00}$, it is determined that the predicate pushed down for $QS_{10}$, T1.x=V.x (+), is pushed down in subsequent transformations evaluated under the linear approach. Accordingly, in the next iteration in which the next join predicate T1.y=V.y (+) is considered, the transformed query generated is $QS_{11}$, which pushes down both predicates. Note, $QS_{01}$ is never considered under the linear approach. Further, as a result of evaluating the transformation for $QS_{10}$, $QS_{01}$ was excluded from query search space while $QS_{11}$ was not. Thus, the decision to consider and undertake a transformation depended on the decision regarding another.

Hardware Overview

Figure 2:
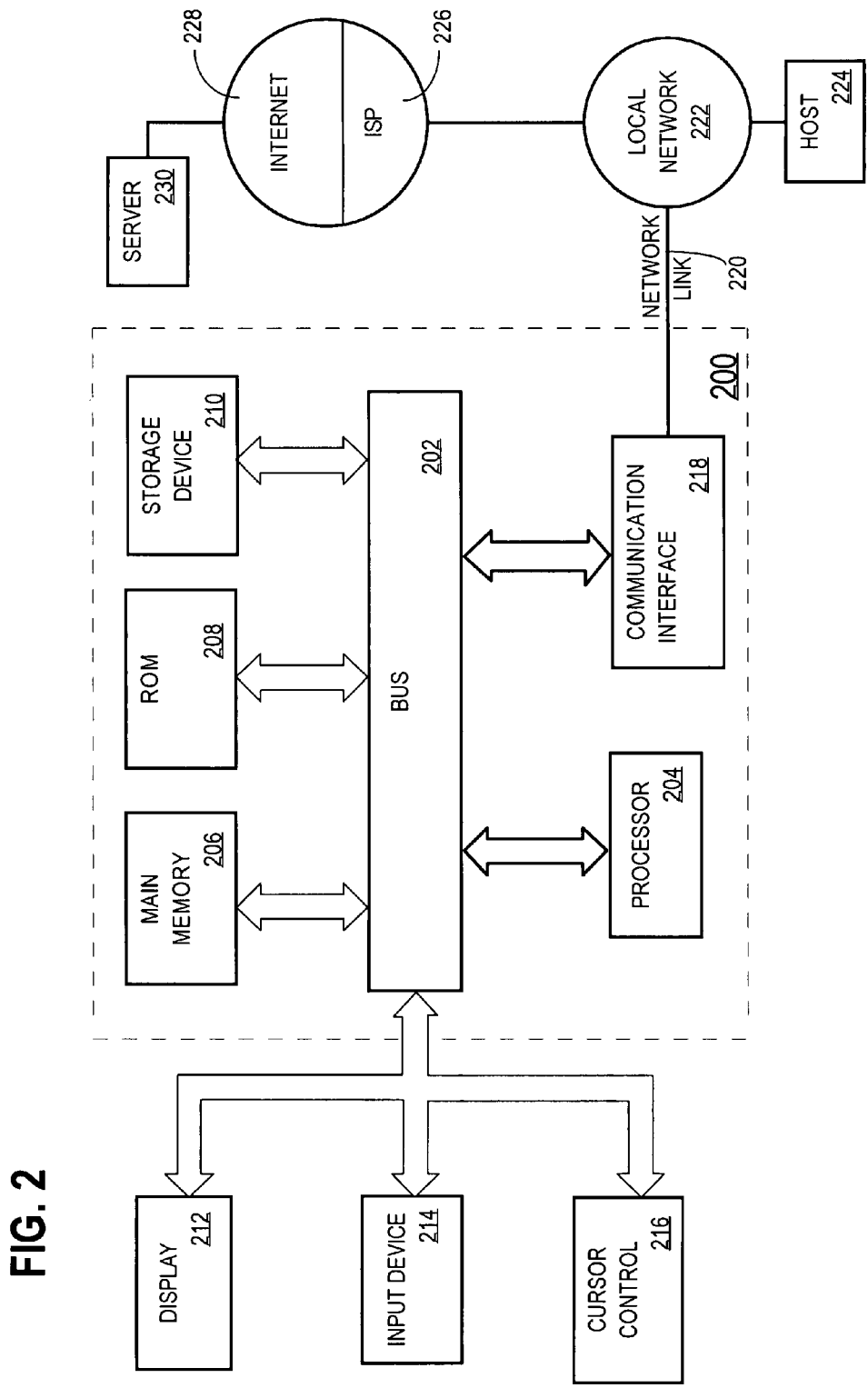
FIG. 2 is a diagram of computer system that may be used in an implementation of an embodiment of the present invention.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212 such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218 which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-readable storage medium storing one or more sequences of instructions which, when executed by one or more processors, causes the one or more processors to perform steps of:
generating a transformed query based on a particular query, wherein said particular query includes:
an outer query;
a view within a FROM list of the outer query;
a join predicate in the WHERE clause of the outer query that references:
an outer table column of an outer table of the outer query, and
a returned column that is returned by the view and that is equivalent to an equivalent column in the SELECT clause of the view;
wherein said view includes:
a GROUP BY operator that references said equivalent column, or
a DISTINCT operator that references said equivalent column; and
wherein generating the transformed query includes pushing down the join predicate into said view, wherein pushing down the join predicate includes (1) removing the join predicate from the outer query and (2) creating, within said view, a new join predicate that references the outer table column of the outer table and said equivalent column.

2. The computer-readable storage medium of claim 1, wherein the step of generating a transformed query includes removing the GROUP BY operator from the view.

3. The computer-readable storage medium of claim 1, wherein the step of generating a transformed query includes removing the DISTINCT operator from the view.

4. A computer-readable storage medium storing one or more sequences of instructions which, when executed by one or more processors, causes the one or more processors to perform steps of:
generating a transformed query based on a particular query, wherein said particular query includes:
an outer query;
a view within a FROM list of the outer query;
a join predicate in the WHERE clause of the outer query that references:
an outer table column of an outer table of the outer query, and
a returned column that is returned by the view and that is equivalent to an equivalent column in the SELECT clause of the view;
wherein generating the transformed query includes pushing down the join predicate into said view, wherein pushing down the join predicate includes (1) removing the join predicate from the outer query and (2) creating, within said view, a new join predicate that references the outer table column of the outer table and said equivalent column;
generating an estimated query execution cost for each of a set of candidate queries that includes said particular query and said transformed query; and
selecting as an optimized query for said particular query a candidate query of said candidate queries.

5. A computer-readable storage medium storing one or more sequences of instructions which, when executed by one or more processors, causes the one or more processors to perform steps of:
generating a transformed query based on a particular query, wherein said particular query includes:
an outer query;
a view within a FROM list of the outer query;
a certain predicate in the WHERE clause of the outer query for an anti-join, said certain predicate referencing:
an outer table column of an outer table of the outer query, and
a returned column that is returned by the view and that is equivalent to an equivalent column in the SELECT clause of the view;
wherein generating the transformed query includes pushing down the certain predicate into said view, wherein pushing down the certain predicate includes (1) removing the certain predicate from the outer query and (2) creating, within said view, a new join predicate that references the outer table column of the outer table and said equivalent column;
generating an estimated query execution cost for each of a set of candidate queries that includes said particular query and said transformed query; and
selecting as an optimized query for said particular query a candidate query of said candidate queries.

6. A computer-readable storage medium storing one or more sequences of instructions which, when executed by one or more processors, causes the one or more processors to perform steps of:
generating a transformed query based on a particular query, wherein said particular query includes:
an outer query;
a view within a FROM list of the outer query;
a certain predicate in the WHERE clause of the outer query for an semi-join, said certain predicate referencing:
an outer table column of an outer table of the outer query, and
a returned column that is returned by the view and that is equivalent to an equivalent column in the SELECT clause of the view;
wherein generating the transformed query includes pushing down the certain predicate into said view, wherein pushing down the certain predicate includes (1) removing the certain predicate from the outer query and (2) creating, within said view, a new join predicate that references the outer table column of the outer table and said equivalent column;
generating an estimated query execution cost for each of a set of candidate queries that includes said particular query and said transformed query; and
selecting as an optimized query for said particular query a candidate query of said candidate queries.

7. A computer-readable storage medium storing one or more sequences of instructions which, when executed by one or more processors, causes the one or more processors to perform steps of:

a database system generating a search space for optimizing a particular query, wherein said particular query includes:
   an outer query;
   a plurality of views in a FROM list of the outer query;
   for each view in said plurality of views, a join predicate in the WHERE clause of the outer query, said join predicate referencing:
      an outer column of an outer table of the outer query, and
      a returned column that is returned by the view and that is equivalent to an equivalent column in the SELECT clause of the view;
   wherein the step of generating a search space includes generating a search space that includes said particular query and one or more query transformations that involve pushing down a join predicate into a respective view of said plurality of views, wherein pushing down the join predicate includes (1) removing the join predicate from the outer query and (2) creating, within said respective view, a new join predicate that references the outer table column of the outer table and the respective equivalent column; and
   selecting an optimized query from among the search space based on query execution costs estimated for the queries in said search space.

8. The computer-readable storage medium of claim 7, wherein the step of generating a search space includes
   performing in an order for each view of said plurality of views, certain steps of:
      generating a transformed query that pushes down the respective join predicate of said each view;
      estimating a query execution cost for said the transformed query;
      making a determination of whether the estimated query execution cost is lower than a previous estimated query execution cost; and
      wherein said transformed query pushes down the respective join predicate of any view of said one or more views for which a determination was made that the query execution is lower than a previous estimated query execution cost.

9. The computer-readable storage medium of claim 7, wherein generating a search space includes generating a search space that includes a transformed query for every combination of join predicate push downs that can be performed with respect to said one or more views.

10. The computer-readable storage medium of claim 7, wherein the step of generating a search space includes generating a search space that includes one or more query transformations that push down a join predicate only if one or more criteria are satisfied, said one or more criteria including that said pushed down predicate open an index access path for a view of said plurality of views.

11. A computer-readable storage medium storing one or more sequences of instructions which, when executed by one or more processors, causes the one or more processors to perform steps of:
   generating a search space for a particular query, wherein said particular query includes:
      an outer query;
      a first view within the FROM list of the outer query;
      a first join predicate in the WHERE clause of the outer query, said first predicate referencing:
         an outer column of an outer table of the outer query, and
         a first returned column that is returned by said first view and that is equivalent to a first equivalent column in the SELECT clause of the first view;
      a second view within the FROM list of the first view;
      a second join predicate of the first view that references a second returned column that is returned by said second view and that is equivalent to a second equivalent column in the SELECT clause of the second view;
   wherein the step of generating a search space includes generating a search space that includes one or more query transformations that each involve pushing down the first join predicate into said second view, wherein pushing down the first join predicate includes (1) removing the first join predicate from the outer query and (2) creating, within said second view, a new join predicate that references the outer table column of the outer table and said second equivalent column; and
   selecting an optimized query from among the search space.

12. A computer-readable storage medium storing one or more sequences of instructions which, when executed by one or more processors, causes the one or more processors to perform steps of:
   generating a transformed query by creating a view in the transformed query;
   wherein said transformed query includes:
      an outer query with a FROM list that includes said view; and
      a join predicate of the outer query that references:
         an outer column of an outer table of the outer query, and
         a returned column that is returned by the view and that is equivalent to an equivalent column in the SELECT clause of the view;
   generating a second transformed query by pushing down the join predicate into said view, wherein pushing down the join predicate includes (1) removing the join predicate from the outer query and (2) creating, within said view, a new join predicate that references the outer table column of the outer table and said equivalent column; and
   selecting an optimized query from among the search space.

* * * * *

UNITED STATES PATENT AND TRADEMARK OFFICE
CERTIFICATE OF CORRECTION

PATENT NO.       : 7,945,562 B2                                    Page 1 of 1
APPLICATION NO.  : 11/716190
DATED            : May 17, 2011
INVENTOR(S)      : Ahmed et al.

It is certified that error appears in the above-identified patent and that said Letters Patent is hereby corrected as shown below:

Title page 3, in column 1, under "Other Publications", line 5, delete "Algorithem" and insert
-- Algorithm --, therefor.

In column 1, line 5, Below "Related Application"
insert -- The present application claims priority to U.S. Provisional Application No. 60/782,785
entitled Cost Based Query Transformation - Join Factorization And Group By Placement, filed on
March 15, 2006 by Hong Su, et al., the entire content of which is hereby incorporated by reference for
all purposes as if fully set forth herein. --.

In column 1, line 42, delete "kinds" and insert -- kinds of --, therefor.

In column 15, line 33, in Claim 8, delete "said the" and insert -- said --, therefor.

Signed and Sealed this
Eleventh Day of October, 2011

David J. Kappos
*Director of the United States Patent and Trademark Office*